(12) United States Patent
Otani et al.

(10) Patent No.: US 6,365,243 B1
(45) Date of Patent: *Apr. 2, 2002

(54) FINE POWDER OF HIGH MOLECULAR WEIGHT FLUORINE CONTAINING FUSED RESINS, ITS MOLD GOODS, AND THE DEDICATED PRODUCTION METHODS

(75) Inventors: Katsuhide Otani; Kiyohiko Ihara, both of Settsu (JP)

(73) Assignee: Daikin Industries Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,454

(22) PCT Filed: Jul. 17, 1995

(86) PCT No.: PCT/JP95/01423

§ 371 Date: Jan. 22, 1997

§ 102(e) Date: Jan. 22, 1997

(87) PCT Pub. No.: WO96/03446

PCT Pub. Date: Feb. 8, 1996

(30) Foreign Application Priority Data

Jul. 22, 1994 (JP) .............................................. 6-191837

(51) Int. Cl.⁷ .......................... C08F 14/18; B29D 23/00; B29D 22/00
(52) U.S. Cl. .................. 428/35.7; 428/36.9; 428/36.92; 526/247; 526/250; 526/252; 526/254; 526/255
(58) Field of Search ............................... 428/35.7, 36.9, 428/36.92; 526/247, 250, 252, 254, 255

(56) References Cited

U.S. PATENT DOCUMENTS

| | | | | |
|---|---|---|---|---|
| 3,981,852 A | * | 9/1976 | Manwiller | .................. 526/255 |
| 3,981,853 A | * | 9/1976 | Manwiller | .................. 526/255 |
| 4,379,900 A | | 4/1983 | Sulzbach | |
| 5,087,680 A | | 2/1992 | Duan et al. | |
| 5,176,958 A | | 1/1993 | Shimizu et al. | |

FOREIGN PATENT DOCUMENTS

| | | |
|---|---|---|
| EP | 0111343 | 1/1987 |
| EP | 0111342 | 7/1988 |
| JP | 37-4643 | 7/1960 |
| JP | 49-115190 | 11/1974 |
| JP | 51-116849 | 10/1976 |
| JP | 4-202329 | 7/1992 |
| JP | 5-186582 | 7/1993 |
| JP | 6-80733 | 3/1994 |

* cited by examiner

Primary Examiner—Rena L. Dye
(74) Attorney, Agent, or Firm—Armstrong, Westerman & Hattori, LLP

(57) ABSTRACT

The fine powder of high molecular weight fluorine containing resins having melt viscosities of $10^6$ to $10^{13}$ poise, apparent density of 0.4 to 1.5 g/cc, and specific surface area of 2 m²/g or less, mold goods of the fine powder and these production methods. By utilizing the fine powder of high molecular weight flourine containing fused resins that have previously not been employed, the mold goods obtained from the fine powder have fewer liquated particles and have become the most suitable especially for manufacturing semiconductors. The powder's products have greater resistance to flex fatigue, abrasion, resistance, etc.

6 Claims, No Drawings

FINE POWDER OF HIGH MOLECULAR WEIGHT FLUORINE CONTAINING FUSED RESINS, ITS MOLD GOODS, AND THE DEDICATED PRODUCTION METHODS

FIELD OF THE INVENTION

This invention relates to (a) the fine powder of high molecular weight fluorine containing fused resins (this fine powder is especially suitable in producing jigs, etc. used in the manufacturing processes of semiconductors), (b) mold goods obtained by molding this fine powder, and (c) these production methods.

BACKGROUND OF THE INVENTION

Inasmuch as fluorine containing fused resins are especially excellent in heat resistance, chemical resistance, electrical insulation, nonviscous property, lower friction property, etc. among many kinds of plastics, they are applied in fields ranging from the space development and aircraft industries to the household goods industry, chemical industry, the electric and electronic industries, and the machine industry.

It is comparatively difficult, however, to mold fluorine containing fused resins because they have higher melt viscosities and narrower ranges of proper mold processing conditions as compared with other general-purpose plastics. Such resins, moreover, may decompose slightly at high molding temperatures to produce corrosive gases. Especially, as high molecular weight resins having a melt viscosity of $10^6$ or greater poise are excessively high in melt viscosity and very low in fluidity, it is very difficult to mold them by ordinary extrusion molding and injection molding. As a result, these resins have so far been without an application.

Conversely, as appreciated from the case of superhigh molecular weight polyethylene, plastics generally develop merits with increased molecular weight. It is thus possible to improve mechanical properties, including strength, modulus of elasticity, abrasion resistance and resistance to flex fatigue; and to improve chemical properties such as weatherability and chemical resistance. It is therefore naturally expected that valuable improvements of properties can be achieved also in fluorine containing fused resins by increasing their molecular weight. Such improvements, however, have not been utilized practically because of the above-mentioned molding difficulty. Rather, techniques of lowering the molecular weight of fluorine containing resins have been studied while maintaining their mechanical and chemical properties.

Furthermore, although fluorine containing fused resins are usually molded by extrusion and injection, the resins are supplied in the form of pellets, as with other general-purpose plastics. This is done to secure a good supply of raw materials for molding machines, including facile dropping through hoppers and feeding into the screws, and to make the handling of raw materials easy.

High molecular weight resins, however, having melt viscosities of $10^6$ or greater poise are difficult to pelletize because of excessive melt viscosity.

Accordingly, there exists no alternative to their being supplied in the form of powder as they are. Powder, however, immediately following polymerization has low apparent density and inferior fluidity, making its supply unstable. This has also been a factor obstructing the practical use of high molecular weight fluorine containing fused resins.

Conversely, inasmuch as fluorine containing fused resins have the above-mentioned excellent properties, it is the ingredient of choice in the manufacturing processes of semiconductors as mold goods such as wafer carriers, tubes, joints, square brackets, etc. Because LSI is highly integrated and concentrated, minute amounts of impurities such as particles, metals, etc. have come into question. Concerning mold goods of fluorine containing fused resins used in these applications, the demand for high purity is also increasing.

Accordingly, the liquation of particles from mold goods of fluorine containing fused resins is a problem. Proposed to decrease the number of liquated particles have been a method for extracting these particles with a fluorine-containing solvent, and a method of washing mold goods with isopropyl alcohol, etc. Both methods, however, have problems in cost and productivity because they are after-treatments conducted by means of special equipment and chemical liquids.

SUMMARY OF THE INVENTION

The purposes of this invention are (a) to improve the properties of fine powder of high molecular weight fluorine containing fused resins that have not been utilized, (b) to offer mold goods that have diminished numbers of liquated particles and that are preferable to the manufacturing processes of semiconductors by molding the fine powder, and (c) to offer the production methods of these mold goods.

DETAILED DESCRIPTION OF THE INVENTION

This invention thus relates (a) to the fine powder of high molecular weight fluorine containing fused resins having melt viscosities of $10^6$ to $10^{10}$ poise, apparent densities of 0.4 to 1.5 g/cc, and specific surface areas of 2 $m^2$/g or less; and (b) to mold goods obtained by molding the fine powder.

As the kinds of fluorine containing fused resins in this invention, at least one kind of resins are given that are selected from the resin group composed of copolymers of tetrafluoro ethylene and perfluoro alkylvinyl ether (hereinafter "PFA"), copolymers of tetrafluoroethylene and hexafluoropropene (hereinafter "FEP"), copolymers of tetrafluoro ethylene and ethylene (hereinafter "ETFE"), vinylidene fluoride homopolymers (hereinafter "PVDF"), copolymers of vinylidene fluoride and tetrafluoro ethylene, copolymers of vinylidene fluoride and hexafluoropropene, copolymers of vinylidene fluoride and chlorotrifluoroethylene, copolymers of chlorotrifluoroethylene and ethylene (hereinafter "ECTFE"), etc. Here, a copolymer PFA is preferable to be a copolymer of tetrafluoro ethylene and at least one kind of perfluoro alkylvinyl ethers as expressed by the formula $CF_2=CFO(CF_2)mF$ (in this formula, m is an integral number of one to six), or a formula $CF_2=CF(O-CF_2CF(CF_3))nOC_3F_7$ (in this formula, n is an integral number of 1 to 4); and is especially preferable to be a copolymer of tetrafluoro ethylene of 92% to 99% and perfluoro alkylvinyl ether of 1% to 8% by weight. Further, FEP is preferable to be a copolymer of tetrafluoro ethylene of 72% to 96% and hexafluoropropene of 4% to 28% by weight. ETFE is preferable to be a copolymer of tetrafluoro ethylene of 74.5% to 89.3% and ethylene of 10.7% to 25.5% by weight. These fluororesins are allowed to be copolymerized with other monomers in an amount not adversely to affect the essential properties of each resin. As the other monomers, the following compounds are given as examples: (a) tetrafluoro ethylene, (b) chlorotrifluoroethylene, (c) hexafluoropropene, (c) perfluoro alkylvinyl ether, (d) fluoroalkyl (C1 to C10) ethylene, (e) perfluoroalkyl (C1 to C10) allyl ether, (f) compounds expressed by the formula $CF_2=CF[OCF_2CFRf(CF_2)p]qOCF_2(CF_2)rY$ (in this formula, Rf is fluorine atom or trifluoro methyl radical, Y is a halogen atom, p is 0 or 1, q is 0 or an integral number of 1 to 5, r is 0 or an integral number of 1 to 2. When, however, p is 1, Rf is fluorine atom), and (g) compounds expressed by the formula $CH_2=CF(CF_2)nX$ (in this formula, n is an integral number of 0 to 8, and X is a hydrogen or fluorine atom).

The melt viscosity of fluorine containing fused resins in this invention must indispensably be $10^6$ to $10^{10}$ poise from the point of view of decreasing the number of liquated particles and improving the quality of mold goods,. Those resins having melt viscosity of less than $10^6$ poise, which are collectively called fluorine containing fused resins and are usually commercially available for mold processing, are not preferable because they have lower mechanical properties and large numbers of liquated particles as will be mentioned later. Furthermore, in case of resins having melt viscosities of more than $10^{10}$ poise, their mold processing temperatures cannot help being increased over the starting temperatures of their thermal decompositions to obtain favorable mold goods. Accordingly, these resins are not preferable because their mold goods are foamed and colored.

Generally, resins of high molecular weights that have not hitherto been used—those having melt viscosities of more than $10^6$ poise—are objects of this invention. The polymerization methods, however, of fluorine containing fused resins to be used in this invention are unlimited. Generally well-known methods, such as emulsion polymerization, suspension polymerization, solution polymerization, and bulk polymerization, can be used in producing the resins.

The apparent density of the fine powder of fluorine containing fused resins in this invention must indispensably be 0.4 to 1.5 g/cc from the point of view of powder fluidity, moldability,and improving the quality of mold goods, and is preferably 0.5 to 1.4 g/cc. Those resins having apparent density of less than 0.4 g/cc show bad powder fluidity and are apt unevenly to be filled in dies in case of injection molding and compression molding, resulting in failure to produce favorable mold goods. Further, those resins having apparent densities exceeding 1.5 g/cc also do not produce favorable mold goods because the powder particles cannot sufficiently be mutually welded.

The specific surface area of the fine powder of fluorine containing fused resins in this invention must indispensably be 2 $m^2/g$ or less from the point of view of powder fluidity, and preferably should be 1 $m^2/g$ or less. If the specific surface area is greater than 2 $m^2/g$, powder fluidity is low as a result of insufficient firmness of the powder particles. Such powder is not preferable especially for molding with screws, such as in injection molding, because the powder is insufficiently taken into the screws. The average particle size ranges from 10 to 2,000 $\mu$m and preferably would be from 50 to 1,000 $\mu$m The raw material powder of fluorine containing fused resins (raw powder) just after polymerization (after coagulation in case of emulsion polymerization) has insufficient firmness with an apparent density of less than 0.4 g/cc and a specific surface area exceeding 2 $m^2/g$. Accordingly, for the above-mentioned reason, this raw powder cannot be supplied to molding machines because it requires increased apparent density and decreased specific surface area.

As methods in this treatment, the following examples are shown. Raw powder of high molecular weight fluorine containing fused resins is heated at temperatures between (m.p.$-10°$ C.) and (m.p.$+20°$ C.), preferably at temperatures between m.p.$+10°$ C., to be welded partially. Then the raw powder is ground. On this occasion if raw powder is heated at temperatures exceeding m.p.$20°$ C., it will be welded excessively and become difficult to grind, resulting in decreased apparent density. Further, if raw powder is heated at temperatures below(m.p.$-10°$ C.), it will be welded insufficiently, resulting in failed diminished specific surface area as a result of inadequate firmness.

Furthermore, it is possible to adopt a method whereby raw powder of high molecular weight fluorine containing fused resins is rolled at temperatures below (m.p.$-10°$ C.), and under pressures of preferably 2 kg/cm$^2$ or more, to make compressed plate-like products, which are finally ground. Although no restriction will be imposed on the method of grinding, and ordinary grinders can be used, it is preferable to use a Henschel grinder, rotor speed mill, etc.

According to these methods, it is possible to obtain a fine powder of high molecular weight fluorine containing fused resins with apparent densities of 0.4 to 1.5 g/cc and specific surface areas of 2 $m^2/g$ or less. This fine powder has good powder fluidity and will ensure a good supply of raw materials to molding machines. Accordingly, the following kinds of molding will become possible.

Only a small change is needed for conventional molding methods to use them as molding methods in this invention, despite the fact that the fluorine containing fused resins to be used have the above-mentioned properties.

The applicable molding methods include compression molding, isostatic molding, transfer molding, ram extrusion molding, extrusion molding, injection molding, blow molding, and flashflow molding.

Molding conditions vary depending on each molding method. Inasmuch, however, as resins of this invention are high in molecular weight and melt viscosity, it is preferable to raise the molding temperatures and die temperatures by 10° to 60° C., and to raise the molding pressures by 50 to 100 kg/cm$^2$ while injection time and pouring time are decelerated by 10 to 100 sec. and the cooling time lengthened by 50 to 100 sec., compared with the molding conditions for conventional fluorine containing fused resins. Molding temperatures must be kept below the thermal decomposition starting temperatures of the resins to be used to prevent mold goods from being foamed and colored.

According to these molding methods, mold goods having desired shapes can be obtained. These include mold goods of complicated shapes such as wafer carriers, wafer boxes, bolts, beakers, filter housings, flowmeters, pumps, valves, cocks, connecting joints, connectors, and nuts; as well as simple mold goods such as sheets, films, gasket, rods,square rods, pipes, tubes, electric wires, circular brackets, square brackets, and tanks.

The mold goods based on this invention are those obtained by using high molecular weight resins that have thus far not been utilized. Accordingly, the rate of lower molecular weight materials in resins has diminished relatively.

Meanwhile, as the main cause of the occurrence of liquated particles from mold goods, which has come into question in the manufacturing processes of semiconductors, it is pointed out that lower molecular weight materials in the resins dissolve in chemical liquids. Accordingly, mold goods based on this invention are best suited for the manufacturing processes of semiconductors because they have a small number of liquated particles.

The fine powder of high molecular weight fluorine containing resins based on this invention is the fine powder of high molecular weight fluorine containing fused resins having a melt viscosity of $10^6$ to $10^{13}$ poise, apparent density of 0.4 to 1.5 g/cc, and specific surface area of 2 $m^2$/g or less, such as not previously been used. Accordingly, mold goods obtained by employing this fine powder have fewer liquated particles and are particularly suited for the manufacturing processes of semiconductors. Furthermore, it will be also possible to improve the properties of the mold goods, such as flex fatigue resistance and abrasion resistance.

EXAMPLE

This invention will be explained in detail in the following examples with reference to Comparative Examples. This invention, however, should not be restricted solely to these examples.

The word "part" in the following examples means the weight factor unless otherwise indicated.

First, the measurement of each physical property in the following examples was made according to the following plans.

(1) Melt Viscosity

Melt viscosity was measured using a capillary flow tester (Shimazu Corp.). Two grams of the resin to be measured were infused into a cylinder 9.5 mm in inside diameter and heated for 5 min. for maintenance at the following temperature. Then the resin was extruded under 7 kg/cm$^2$ of piston load through an orifice 2.1 mm in inside diameter and 8 mm in length. Melt viscosity was calculated in poise from the extrusion speed of this test.

PFA and FEP: 380° C.

ETFE and ECTFE: 300° C.

PVDF: 230° C.

(2) Melting Point

This is a value (° C.) that was measured by a differential scanning calorimeter (DSC-7, Perkin Elmer Co.) at a temperature-raising speed of 10° C./min.

(3) Starting Temperature of Thermal Decomposition

This is a value (° C.) that was measured by a thermal gravimetric analyzer (TGA-50, Shimazu Seisakusho Co.) at a temperature-raising speed of 10° C./min.

(4) Apparent Density

Measurement followed JIS K-6891. After powder samples were dropped through a damper into a cylindrical stainless vessel 30 cc in inside volume, surplus powder was rubbed off by a flat plate. The apparent density is a value (g/cc) obtained by dividing the weight of the remaining sample (g) by the inside volume (cc).

(5) Specific Surface Area

This is a value (m$^2$/g) that was measured by a direct reading type specific surface area apparatus (Monosorb, Yuasa Aionix Co.).

(6) MIT Value (Resistance to Flex Fatigue)

Measurement followed ASTM D-2176. A MIT type flex fatigue resistance tester (Toyo Seiki Seisakusho Co.) was used. Test pieces were out off from compression molding sheets 0.20 to 0.23 mm in thickness. The test pieces were measured under the condition of a load of 1.25 kgf, a flex speed of 178 times/min., and a flex angle of 135°.

(7) Taber Abrasion Index (Abrasion Resistance)

Measurement followed JIS K-7204. Compression molding sheets 1 mm in thickness and 102 mm in diameter were used as test pieces and measured by a Taber abrasion testing machine (No. 410, Toyo Seiki Seisakusho Co.).

Abrasion tests were conducted under the condition of using CS-10 as an abrasion wheel, applying a load of 1 kgf, and abrading 2,000 times at 70 rpm. The Taber abrasion index is indicated as the figure of abrasion loss (mg) per 1,000 times abrasion.

Comparative Example 1
(Commercially Available PFA Used)

Using commercially available PFA pellets having a melt viscosity of 3.1×10$^4$ poise (Neoflon PFA AP-210, Daikin Kogyo Co., Ltd.) as a raw material, injection molding was conducted using an injection molding machine with a disk mold (100 mm¢, 2 mm in thickness) under the molding conditions shown in the following Table 1. In such molding, raw material PFA was fed into a cylinder with a nozzle through a hopper and melted by raising the temperature of the cylinder.

Then, being injected into the cavity through the nozzle, the melted fluoro resin was compressed by a compression plate under a compression pressure of 30 kgf/cm$^2$.

The raw material used in this molding was smoothly supplied, from dropping through the hopper to being taken into the screws, and stably measured, resulting in normal molding. The obtained mold goods had good quality, having no foamed or colored part, as well as no whitened part from insufficient welding or melting.

Comparative Example 2
(Commercially Available PFA Used)

Using commercially available PFA pellets having melt viscosity of 2.5×10$^5$ poise (Neoflon PFA AP-230, Daikin Kogyo Co., Ltd.) as a raw material, injection molding was conducted using the same injection molding machine as in Comparative Example 1 under the molding conditions shown in the following Table 1.

This material was smoothly supplied, from dropping through the hopper to being taken into the screws, and stably measured, resulting in normal molding. The obtained mold goods had good quality, having no foamed or colored part, as well as no whitened part as a result of insufficient welding or melting.

Comparative Example 3
(High Molecular Weight PFA Used)

In a glass-lined autoclave with a jacket equipped with a stirrer with a capacity of 4,000 parts water, 1,040 parts of decarbonated and demineralized water were fed. After being sufficiently substituted with pure nitrogen gas, the inner space was vacuumed. Then 800 parts of 1,2-dichloro-1,1,2, 2-tetrafluoro ethane (hereinafter "R-114") and 40 parts of perfluoropropyl vinyl ether(hereinafter "PPVE") were fed.

Stirring the mixture and keeping the internal temperature at 15° C., tetrafluoroethylene (hereinafter "TFE") was fed under pressure to keep the internal pressure of the autoclave at 2.4 kg/cm$^2$ G.

When three parts of bis-(2,2,3,3,4,4,5,5,6,6,7,7-dodecafluoroheptanoyl)-peroxide (hereinafter "DHP") were added to the mixture as a polymerization initiator, the reaction started immediately. As pressure drops with the progress of the reaction, TFE was additionally fed under pressure to keep the internal pressure in the autoclave at 2.4 kg/cm$^2$ G. After the reaction was conducted for 130 min., stirring was stopped. Then the unreacted monomer and R-114 were purged.

The white powder produced within the autoclave was washed and dried at 120° C. for 12 hours. Thus 270 parts of the intended high molecular weight PFA powder was obtained. Concerning the physical properties of this PFA, it was confirmed that the melt viscosity was 4.2×10$^6$ poise and the PPVE content was 3.2 wt % (measured by melting NMR measurement). Other physical properties were as shown in the following Table 1.

Using this high molecular weight PFA as the raw material, injection molding was tried by using the same injection molding machine as in Comparative Example 1 under the molding conditions shown in the following Table 1. The raw material, however, only turned round on the screw parts and was difficult to charge. Although the raw material was poked by a rod from the hopper part to be charged, its weighing was unstable. Accordingly, no favorable mold goods could be obtained.

Example 1
(High Molecular Weight PFA Used)

After the high molecular weight PFA powder that had been obtained in Comparative Example 3 was heated at 310° C. for six hours in an electric furnace, the powder was ground by a Henschel grinding machine for 10 min. The physical properties of the obtained fine powder of high molecular weight PFA were as shown in the following Table 1.

Using this high molecular weight PFA as the raw material, injection molding was tried under the same molding conditions as in Comparative Example 3. This material was smoothly supplied, from dropping through the hopper to being taken into the screws, and stably measured, resulting in normal molding. The obtained mold goods had good quality, having no foamed or colored part, as well as no whitened part as a result of insufficient welding or melting. Moreover, the flex fatigue resistance and abrasion resistance were greatly improved.

Comparative Example 4
(Commercially Available FEP Used)

Using commercially available FEP pellets having melt viscosity of $7.5 \times 10^4$ poise (Neoflon FEP NP-20, Daikin Kogyo Co., Ltd.) as a raw material, compression molding was conducted with a compression molding mold under the molding conditions shown in the following Table 2. The mold is designed to compress resins between the two molds: an upper mold and a lower one.

The obtained sheet-like mold goods had good quality, having no foamed or colored part, as well as no whitened part resulting from insufficient welding or melting.

Comparative Example 5
(Commercially Available FEP Used)

Using commercially available FEP pellets having melt viscosity of $4.0 \times 10^5$ poise (Neoflon FEP NP-40, Daikin Kogyo Co., Ltd.) as a raw material, compression molding was conducted with the same compression molding die used in Comparative Example 4, under the molding conditions shown in the following Table 2.

The obtained sheet-like mold goods had good quality, having no foamed or colored part, as well as no whitened part resulting from insufficient welding or melting.

Comparative Example 6
(High Molecular Weight FEP Used)

In a glass-lined autoclave with a jacket equipped with a stirrer, with a capacity of 4,000 parts water, 1,300 parts of decarbonated and demineralized water were infused. After being sufficiently substituted with pure nitrogen gas, the inner space was vacuumed. Then 1,300 parts of hexafluoropropene (hereinafter "HFP") were fed. Stirring the mixture and keeping the internal temperature at 25.5° C., tetrafluoro ethylene (TFE) was fed under pressure to keep the internal pressure of the autoclave at 9.0 kg/cm² G.

When 1.9 parts of DHP were added to the mixture as a polymerization initiator, reaction started immediately. As pressure fell with the progress of the reaction, TFE was additionally fed under pressure to keep the internal pressure in the autoclave at 9.0 kg/cm² G. After the reaction was conducted for 240 min., stirring was stopped. Then the unreacted monomer was purged.

The white powder produced within the autoclave was washed and dried at 120° C. for 12 hours. Thus 415 parts of the intended superhigh molecular weight FEP powder was obtained. Regarding the physical properties of this FEP, it was confirmed that the melt viscosity was $2.9 \times 10^6$ poise and the HFP content was 8.2 wt % (measured by melting NMR measurement). Other physical properties were as shown in the following Table 2.

Using this high molecular weight FEP as a raw material, compression molding was conducted using the same compression molding mold as in Comparative Example 4 under the molding conditions shown in the following Table 2.

The obtained sheet-like mold goods were found to have some whitened parts because of insufficient welding and were thus impractical products.

Example 2
(High Molecular Weight FEP Used)

The high molecular weight FEP powder obtained in Comparative Example 6 was hardened to become board-like by using a roller compactor (GBS type, Shinto Kogyo Co.) under the conditions of room temperature and a roll revolution of 0.4 rpm. The board-like products were then ground at 360 rpm by a pulverizer. The obtained fine powder of high molecular weight FEP had the physical properties shown in the following Table 2.

Using this high molecular weight FEP as a raw material, compression molding was conducted with the same compression molding mold as used in Comparative Example 4 under the molding conditions shown in the following Table 2.

The obtained sheet-like mold goods had good quality, having no foamed or colored part, as well as no whitened part resulting from insufficient welding or melting.

Comparative Example 7
(Commercially Available ETFE Used)

Using commercially available ETFE pellets having melt viscosity of $2.2 \times 10^4$ poise (Neoflon ETFE EP-521, Daikin Kogyo Co., Ltd.) as a raw material, transfer molding of the resin was conducted with a pot and mold for transfer molding under the molding conditions shown in the following Table 3. The obtained sheet-like mold goods had good quality, having no foamed or colored part, as well as no whitened part because of insufficient welding or melting.

Comparative Example 8
(Commercially Available ETFE Used)

Using commercially available ETFE pellets having melt viscosity of $4.6 \times 10^4$ poise (Neoflon ETFE EP-541, Daikin Kogyo Co., Ltd.) as a raw material, transfer molding was conducted with a pot and mold for transfer molding under the molding conditions shown in the following Table 3. The obtained sheet-like mold goods had good quality, having no foamed or colored part, as well as no whitened part resulting from insufficient welding or melting.

Comparative Example 9
(High Molecular Weight ETFE Used)

In a glass-lined autoclave with a jacket equipped with a stirrer, with a capacity of 4,000 parts water, 1,000 parts of decarbonated and demineralized water were infused. After being sufficiently substituted with pure nitrogen gas, the inner space was vacuumed. Then 1,000 parts of R-114 and 5.5 parts of 2,3,3,4,4,5,5-heptafluoro-1-pentene (hereinafter "7FP") were fed.

Stirring the mixture and keeping the internal temperature at 35° C., TFE and ethylene were fed under pressure to keep the internal pressure of the autoclave at 7.5 kg/cm² G and the gas phase composition of TFE/ethylene at 74/26 (mole ratio).

When two parts of diisopropylperoxy dicarbonate were added to the mixture as a polymerization initiator, the reaction started immediately. As the pressure fell with the progress of the reaction, TFE and ethylene were additionally fed under pressure to keep the internal pressure of the autoclave at 7.5 kg/cm² G, and the gas phase composition of TFE/ethylene at 74/26 (mole ratio). 4.5 parts of 7FP were also added as occasion demanded. After the reaction was conducted for 150 min., stirring was stopped. Then the unreacted monomer and R-114 were purged.

White powder produced within the autoclave was washed and dried at 120° C. for 12 hours. Thus 109 parts of the intended high molecular weight ETFE powder was obtained. Regarding the physical properties of this ETFE, it was confirmed that the melt viscosity was 6.0×10⁶ poise and the composition of the TFE/ethylene/7FP was 76/20/4 (wt %) (measured by melting NMR measurement). The other physical properties were as shown in the following Table 3.

Using this high molecular weight ETFE as a raw material, transfer molding was conducted with the same pot and die for transfer molding as used in Comparative Example 7 under the molding conditions shown in the following Table 3.

The obtained sheet-like mold goods were impractical products, being found to have whitened parts resulting from insufficient welding and melting, and to have rough surfaces.

Example 3
(High Molecular Weight ETFE Used)

After the high molecular weight ETFE powder that had been obtained in Comparative Example 9 was heated at 255° C. for four hours in an electric furnace, the powder was ground by a Henschel grinding machine for 10 min. The physical properties of the obtained fine powder of high molecular weight ETFE were as shown in the following Table 3.

Using this high molecular weight ETFE as a raw material, transfer molding was conducted under the same molding conditions as in Comparative Example 9.

The obtained sheet-like mold goods were of good quality, having no foamed or colored portion, as well as no whitened part as a result of insufficient welding or melting. Abrasion resistance was also improved.

Example 4
(Measurement of Liquated Particles)

From each of the mold goods obtained in Comparative Examples 1, 2, 4, 5, 7, and 8, and from Examples 1, 2, and 3, five dumbbells were stamped out. Particle liquation tests were conducted using these dumbbells. The Type 5 dumbbells described in ASTM D638 were used.

Inasmuch as considerable particles are attached to the surfaces of these dumbbells as a result of contamination from the atmosphere in the processes of molding and stamping, preliminary washing was done according to the following steps to get rid of these particles.

Thus, after being rinsed with ultra-pure water for 5 min., the dumbbells were put into a clear polyethylene 1-liter bottle. Then fed into the bottle were 200 g of 50% fluoric acid aqueous solution of highly pure semiconductor-grade. The bottle was agitated for 5 min. in a shaker.

The bottle was left for 24 hours before the fluoric acid aqueous solution was removed. The dumbbells were rinsed again with ultra-pure water for 5 min.

In succession, the dumbbells were soaked in 100 ml of a 4:1 mixture of sulfuric acid and aqueous hydrogen peroxide—the highly pure semiconductor-grade—for 5 min. and then rinsed again with ultra-pure water for 5 min.

Each of the five preliminarily washed dumbbells were placed in a clear polyethylene 1-liter bottle. Infused into the bottle were 200 g of 50% fluoric acid aqueous solution—highly pure semiconductor-grade. This was agitated for 5 min. in a shaker.

After being left for 24 hours, the particles (0.2 $\mu$m or more) in fluoric acid aqueous solution were counted by a particle counter (KL-22, Rion Co.).

The counting results of liquated particles are shown in the following Table 4. The value counted by the same method except for the dumbbells is also shown in Table 4 as reference. Only dumbbells made of high molecular weight fluorine containing resins as in Examples 1 to 3 showed minimal numbers of liquated particles.

TABLE 1

(Physical Properties of PFA and Examples of its Mold Goods)

| Items | Units | Comparative Example 1 Commercially available low viscosity | Comparative Example 2 Commercially available high viscosity | Comparative Example 3 High molecular weight | Example 1 High molecular weight |
|---|---|---|---|---|---|
| Physical properties of raw materials | | | | | |
| Melt viscosity | poise | 3.1 × 10⁴ | 2.5 × 10⁵ | 4.2 × 10⁶ | 4.2 × 10⁶ |
| melting point | ° C. | 309 | 309 | 309 | 309 |
| Starting temperature of thermal Decomposition | ° C. | 417 | 430 | 443 | 443 |
| apparent density | g/cc | 1.21 | 1.21 | 0.38 | 0.78 |
| Specific surface area | m²/g | — | — | 4.57 | 0.24 |
| Average particle diameter | $\mu$m | — | — | — | 180 |
| MIT value | cycle | 17,000 | 812,000 | — | 10,050,000 |
| Taber abrasion index | mg | 7.7 | 5.8 | — | 4.4 |

TABLE 1-continued (Physical Properties of PFA and Examples of its Mold Goods)

| Items | Units | Comparative Example 1 Commercially available low viscosity | Comparative Example 2 Commercially available high viscosity | Comparative Example 3 High molecular weight | Example 1 High molecular weight |
|---|---|---|---|---|---|
| Molding conditions | | | | | |
| Molding temperature | °C. | 370 | 420 | 430 | 430 |
| Temperature of the mold | °C. | 180 | 200 | 230 | 230 |
| Injection pressure | kg/cm$^2$ | 30 | 30 | 30 | 30 |
| Injection time | sec. | 25 | 60 | 100 | 100 |
| Cooling time | sec. | 80 | 90 | 150 | 150 |
| Appearance of mold goods | | Good | Good | Some whitened parts and rough surface | Good |

TABLE 2

(Physical Properties of FEP and Examples of its Mold Goods)

| Items | Units | Comparative Example 4 Commercially available low viscosity | Comparative Example 5 Commercially available high viscosity | Comparative Example 6 High molecular weight | Example 2 High molecular weight |
|---|---|---|---|---|---|
| Physical properties of raw materials | | | | | |
| Melt viscosity | poise | 7.5 × 10$^4$ | 4.0 × 10$^5$ | 2.9 × 10$^6$ | 2.9 × 10$^6$ |
| melting point | °C. | 269 | 268 | 275 | 275 |
| Starting temperature of thermal Decomposition | °C. | 413 | 415 | 425 | 425 |
| apparent density | g/cc | 1.21 | 1.14 | 0.34 | 0.63 |
| Specific surface area | m$^2$/g | — | — | 7.21 | 1.02 |
| Molding conditions | | | | | |
| Molding temperature | °C. | 350 | 350 | 380 | 380 |
| Molding pressure | kg/cm$^2$ | 50 | 50 | 100 | 100 |
| Pressuring time | min. | 30 | 30 | 40 | 40 |
| Cooling pressure | kg/cm$^2$ | 50 | 50 | 100 | 100 |
| Cooling time | min. | 5 | 5 | 5 | 5 |
| Appearance of mold goods | | Good | Good | Some whitened parts | Good |

TABLE 3

(Physical Properties of ETFE and Examples of its Mold Goods)

| Items | Units | Comparative Example 7 Commercially available low viscosity | Comparative Example 8 Commercially available high viscosity | Comparative Example 9 High molecular weight | Example 3 High molecular weight |
|---|---|---|---|---|---|
| Physical properties of raw materials | | | | | |
| Melt viscosity | poise | 2.2 × 10$^4$ | 4.6 × 10$^4$ | 6.0 × 10$^6$ | 6.0 × 10$^6$ |
| melting point | °C. | 266 | 265 | 265 | 265 |
| Starting temperature of thermal Decomposition | °C. | 345 | 346 | 346 | 346 |
| apparent density | g/cc | 1.01 | 1.00 | 0.25 | 0.42 |
| Specific surface area | m$^2$/g | — | — | 8.07 | 1.67 |
| Average particle diameter | μm | — | — | — | 178 |
| Taber abrasion index | mg | 10.8 | 10.0 | — | 8.5 |
| Molding conditions | | | | | |
| Pot temperature | °C. | 290 | 300 | 330 | 330 |
| Mold temperature | °C. | 250 | 260 | 270 | 270 |
| Pouring time | sec. | 30 | 50 | 60 | 60 |

TABLE 3-continued (Physical Properties of ETFE and Examples of its Mold Goods)

| Items | Units | Comparative Example 7 Commercially available low viscosity | Comparative Example 8 Commercially available high viscosity | Comparative Example 9 High molecular weight | Example 3 High molecular weight |
|---|---|---|---|---|---|
| Molding pressure | kg/cm$^2$ | 100 | 150 | 200 | 200 |
| Cooling time | ° C. | 50 | 50 | 50 | 50 |
| Appearance of mold goods | | Good | Good | Some whitened parts and rough surface | Good |

TABLE 4

(Number of Liquated Particles (unit: Particles/ml))

| | |
|---|---|
| Reference example | 10 |
| Comparative Example 1 | 476 |
| Comparative Example 2 | 703 |
| Example 1 | 241 |
| Comparative Example 4 | 638 |
| Comparative Example 5 | 623 |
| Example 2 | 307 |
| Comparative Example 7 | 862 |
| Comparative Example 8 | 912 |
| Example 3 | 409 |

As clearly demonstrated by the above results, mold goods produced from the fine powder of high molecular weight fluorine containing resins based on this invention are excellent in flex fatigue resistance and abrasion resistance. Such goods have the advantage of reducing the number of liquated particles by half as compared with conventional mold goods. Accordingly, the mold goods based on this invention are best suited for semiconductor manufacturing applications.

What is claimed is:

1. A fine powder of high molecular weight fluorine containing melt-processible fused resins having melt viscosities of 2.9×10$^6$ to 6.0×10$^6$ poise, apparent densities of 0.4 to 1.5 g/cc, and specific surface areas of 2 m$^2$/g maximum, said high molecular weight fluorine containing melt-processible fused resins comprising at least one kind of fluorine containing resin selected from the group consisting of copolymers of tetrafluoroethylene and perfluoro alkylvinyl ether, copolymers of tetrafluoroethylene and hexafluoropropene, copolymers of tetrafluoroethylene and ethylene, vinylidene fluoride homopolymer, copolymers of vinylidene fluoride and tetrafluoroethylene, copolymers of vinylidene fluorine and hexafluoropropene, copolymers of vinyleidene fluoride and chlorotrifluoreothylene, and copolymers of chlorotrifluoroethylene and ethylene, wherein the tetrafluoroethylene copolymers consist of tetrafluoroethylene as a predominant constituent of not less than 72% by weight to not more than 99% by weight, and other copolymerizable monomer.

2. Mold goods obtained by molding the fine powder of high molecular weight fluorine containing fused resins as defined in claim 1.

3. Mold goods as defined in claim 2, wherein the goods are jigs used in manufacturing processes of semiconductors.

4. A method of producing fine powder of high molecular weight fluorine containing melt-processible fused resins comprising the steps of heating raw material powder of fluorine containing melt-processible fused resins just after polymerization, as defined in claim 1, at temperatures between 10° C. below a melting point of the fluorine containing melt-processible fused resins and 20° C. above the melting point of the fluorine containing melt-processible fused resins, and then grinding the heated powder.

5. A method of producing fine powder of high molecular weight fluorine containing melt-processible fused resins comprising the steps of rolling raw material powder of fluorine containing melt-processible fused resins just after polymerization, as defined in claim 1 at temperatures at least 10° C. below a melting point of the fluorine containing melt processible fused resins to make a board-like product, which is then ground.

6. Mold goods as defined in claim 2, wherein the goods are wafer carriers, tubes, joints and square brackets used in manufacturing processes of semiconductors.

* * * * *